United States Patent [19]
Sumiyoshi et al.

[11] 3,710,630
[45] Jan. 16, 1973

[54] AUTOMATIC TRANSMISSION SYSTEM HAVING A SHOCK PREVENTING FUNCTION IN GEAR SHIFTING

[75] Inventors: Masaharu Sumiyoshi, Toyota; Shigeru Sakakibara, Aichi-ken; Osamu Ito, Toyota; Hisato Wakamatsu, Kariya; Takaaki Kato, Toyohashi, all of Japan

[73] Assignees: Toyota Jidosha Kogyo Kabushiki Kaisha, Toyota-shi; Nippondenso Kabushiki Kaisha, Aichi-ken, Japan

[22] Filed: July 9, 1970

[21] Appl. No.: 53,513

[30] Foreign Application Priority Data

July 18, 1969 Japan ..................44/57185

[52] U.S. Cl..............74/752 A, 74/731, 74/866, 74/867
[51] Int. Cl........F16h 5/42, F16h 47/00, B60k 21/00
[58] Field of Search....74/731, 866, 365, 336, 752 D, 74/752 A

[56] References Cited

UNITED STATES PATENTS

| 2,373,453 | 4/1945 | Brunken | 74/731 |
| 3,007,351 | 11/1961 | Hilpert | 74/731 X |
| 3,335,830 | 8/1967 | De Castelet | 74/365 X |
| 3,433,101 | 3/1969 | Scholl et al. | 74/866 |
| 3,439,564 | 4/1969 | Scholl et al. | 74/866 |
| 3,448,640 | 6/1969 | Nelson | 74/866 |

Primary Examiner—Arthur T. McKeon
Attorney—Cushman, Darby & Cushman

[57] ABSTRACT

An automatic transmission comprising as the essential units thereof a torque converter transmission, a hydraulic actuation circuit and electrical circuitry for controlling the distributor valve incorporated in the hydraulic actuation circuit, wherein the working oil pressure applied to the transmission is reduced according to a signal generated upon gear change so as to eliminate the shock caused during the gear change; whereas while the torque is being transmitted excepting during such gear change, the working oil pressure is maintained at a sufficiently high value in order to prevent the slippage of the friction engaging means in the transmission.

5 Claims, 14 Drawing Figures

AUTOMATIC TRANSMISSION SYSTEM HAVING A SHOCK PREVENTING FUNCTION IN GEAR SHIFTING

This application has a common assignee to the related copending applications of Shirai et al., Ser. No. 855,606, filed Sept. 9, 1968, now U.S. Pat. No. 3,572,168; Shirai et al., Ser. No. 855,510, filed Sept. 5, 1969, now U.S. Pat. No. 3,640,152; Sumiyoshi et al., Ser. No. 876,784, filed Nov. 4, 1969, which is now abandoned in favor of the continuation-in-part application, Ser. No. 223,476, filed Feb. 4, 1972; Sumiyoshi et al., Ser. No. 30,871, filed Apr. 22, 1970, now U.S. Pat. No. 3,640,151; Sumiyoshi et al. application Ser. No. 45,779 filed June 12, 1970; Sumiyoshi et al. application Ser. No. 53,364 filed July 9, 1970, and Sumiyoshi et al. Ser. No. 62,793, filed Aug. 11, 1970.

The present invention relates to an automatic transmission which is so designed that it functions to eliminate the shock that is transmitted to the vehicle due to variation of torque caused when the gears are engaged in the transmission gear system to effect a shift.

In the past, with a vehicle equipped with an automatic transmission incorporating a torque converter, when the frictional engaging means were actuated for gear changing purposes, an impulsive torque change was caused at the transmission output shaft because of a difference between the torque transmitted from the engine and the freewheeling torque of the vehicle, so that this variation of torque transmitted a shock to the vehicle, hence a short time acceleration or deceleration of the vehicle thus making the driver feel discomfort. The usual method hitherto known in the art was to gradually decrease the working oil pressure according to the first, second and third gear positions of the transmission. Another method employed was to slightly change the working oil pressure according to the throttle valve openings, the internal combustion engine rpm, the car's speed, etc.

However, these methods had drawbacks such as the complexity of the hydraulic circuit, and the unstable operation of the hydraulic circuit owing to variations in the operating conditions caused by the working oil temperature changes.

Therefore, in order to overcome the aforesaid drawbacks, the present invention has for its object the provision of a torque converter automatic transmission system incorporating electrical operating circuitry, which functions to reduce the working oil pressure upon gear change so as to eliminate the shock produced during the gear changing operations.

As set forth in conjunction with the descriptions of the preferred embodiments, the present invention primarily consists of an automatic transmission system whose principal parts comprise a torque converter transmission, a hydraulic actuation circuit and an electrical circuitry for controlling the distributor valve incorporated in the hydraulic actuation circuit, and wherein the working oil pressure applied to the transmission is reduced according to a signal generated upon gear change so as to eliminate the shock produced during the gear change, whereas while the torque is being transmitted excepting during such gear change, the working pressure is maintained at a sufficiently high value to thereby prevent the slippage of the friction engaging means in the transmission.

According to the present invention, in a torque converter automatic transmission system adapted to change gears according to a predetermined shift line, the working oil pressure is reduced upon gear change so that a shock produced and transmitted to the vehicle during the gear change is eliminated. Moreover, in a torque converter automatic transmission system incorporating shift operating circuitry, the operating circuit for controlling the oil pressure may make use of those AND circuits which provide shift signals in common with the shift operating circuitry, so that a shock caused by a gear change can be prevented through the addition of a few components such as circuits and valves.

According to the present invention, there is a further effect in that when changing the gear ratio from a high to a lower gear the working oil pressure is reduced only when the engine rpm is lower than a predetermined value, so that when changing gears the working oil pressure is reduced only in case the reduction of working oil pressure is really needed, thereby avoiding the reduction of the working oil pressure in gear changing operations where the engine torque is not high enough to readily cause variation of torque and there is no need to reduce the working oil pressure but it only tends to increase the slippage of the friction engaging means (as in the case of $[N1] > 1000$ rpm for the gear change from a high to a lower gear in the abovementioned embodiment).

According to the present invention, there is a still further effect in that when the vehicle is running at a high speed thus requiring not much greater torque transmission (where $[N2] > 3,000$ rpm), the working oil pressure is held at a low value irrespective of gear changes with the result that the power consumption of the gear pump is reduced, no engine output is consumed and the wear of the gear pump is eliminated.

According to the present invention, it is also possible to ensure perfect elimination of a shock even under those circumstances where the occurrence of an especially large shock may be expected, since a time-delay circuit is incorporated to reduce the working oil pressure prior to the initiation of a gear changing operation.

According to the present invention, the time of reducing the working oil pressure is delayed through the use of a time-delay circuit behind the time at which a gear changing operation is to be initiated, so that the working oil pressure may be reduced only during a short period of time when the reduction of pressure is mostly needed, thereby eliminating any shock due to the gear change and minimizing the wear of friction engaging means.

In short, the present invention has a remarkable effect in that it ensures the elimination of shock due to gear changes, that best suits torque converter automatic transmission systems.

The above and other objects, features and advantages of the present invention will become more apparent from the following descriptions of preferred embodiments taken in conjunction with the accompanying drawings in which.

Figure 1:
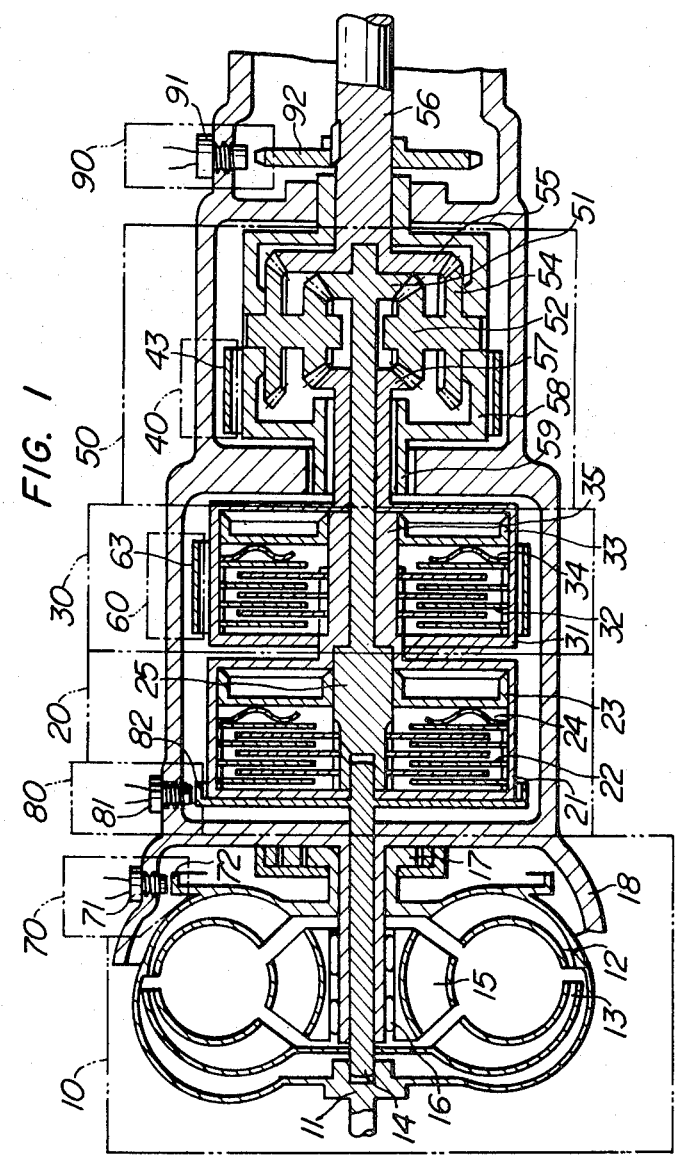
FIG. 1 is a sectional view of a transmission system embodying the present invention.

The present invention will now be explained in detail with al to one embodiment thereof wherein the invention has been applied to a two forward speed automatic transmission system. However, it is to be understood that the present invention is in no way limited to this, but it may be likewise applied to a three forward speed automatic transmission system or a multi-range automatic transmission system having more than three forward speeds. Multiple speed automatic transmission systems are fully disclosed in the aforesaid Shirai et al. U.S. Pat. No. 3,572,168 which also fully describes and shows all of FIGS. 1 to 10 hereof. Similarly, the aforesaid Sumiyoshi et y al. application Ser. No. 45,779 fully describes and shows FIGS. 11 and 12 hereof.

To begin with, the construction of a two forward speed automatic transmission system will now be explained. An embodiment of the transmission will be discussed hereunder referring by way of a typical example to the two forward speed automatic transmission equipped with a torque converter shown in FIG. 1. This torque converter two forward speed automatic transmission comprises a torque converter 10 and a transmission gear system including a front clutch 20, a rear clutch 30, a rear brake 40 and a gear train 50. At the input side of the torque converter 10, the revolving output shaft of an internal combustion engine which is not shown, is directly connected to a torque converter pump shaft 11 and the shaft 11 is directly connected to a torque converter pump 12. The torque converter comprises the torque converter pump 12, a torque converter turbine 13 in opposed relation with the pump 12 and a stator 15 disposed therebetween and provided with a one-way clutch 16. While the operation of these members is well known in the art and thus will not be explained in detail, the torque converter pump 12 delivers a circulating fluid flow and the torque converter turbine 13 transmits a turning effort to a turbine shaft 14 by virtue of the momentum of the circulating fluid flow.

In other words, the turning effort is transmitted between the torque converter pump and the torque converter turbine with a difference (slip ratio) in revolutions between the two members. With a small difference in the revolutions the torque transmitted will be small, while a large torque will be transmitted if there is a big difference between the two speeds. Thus, these members function to transmit varying turning efforts. The speed difference just referred to may be expressed in terms of the speed ratio (slip ratio).

An oil pressure pump 17 consists of a gear pump and it is directly connected to the torque converter pump shaft 11 for the purposes that will be discussed later. The front clutch 20 is composed of a clutch drum 21 integrally coupled to the torque converter turbine shaft 14, a multi-disk clutch 22, a clutch piston 23, a plate spring 24 and a clutch shaft 25, so that the application of working oil pressure to the clutch piston 22 engages the shafts 14 and 25 with each other through the clutch 20.

The rear clutch 30 comprises a clutch shaft 35 integrally coupled to a clutch drum 21, a clutch drum 31, a multi-disk clutch 32, a clutch piston 33, and a plate spring 34, whereby the application of working oil pressure to the clutch piston 33 causes the drums 21 and 31 to engage with each other through the clutch 30.

Figure 2:
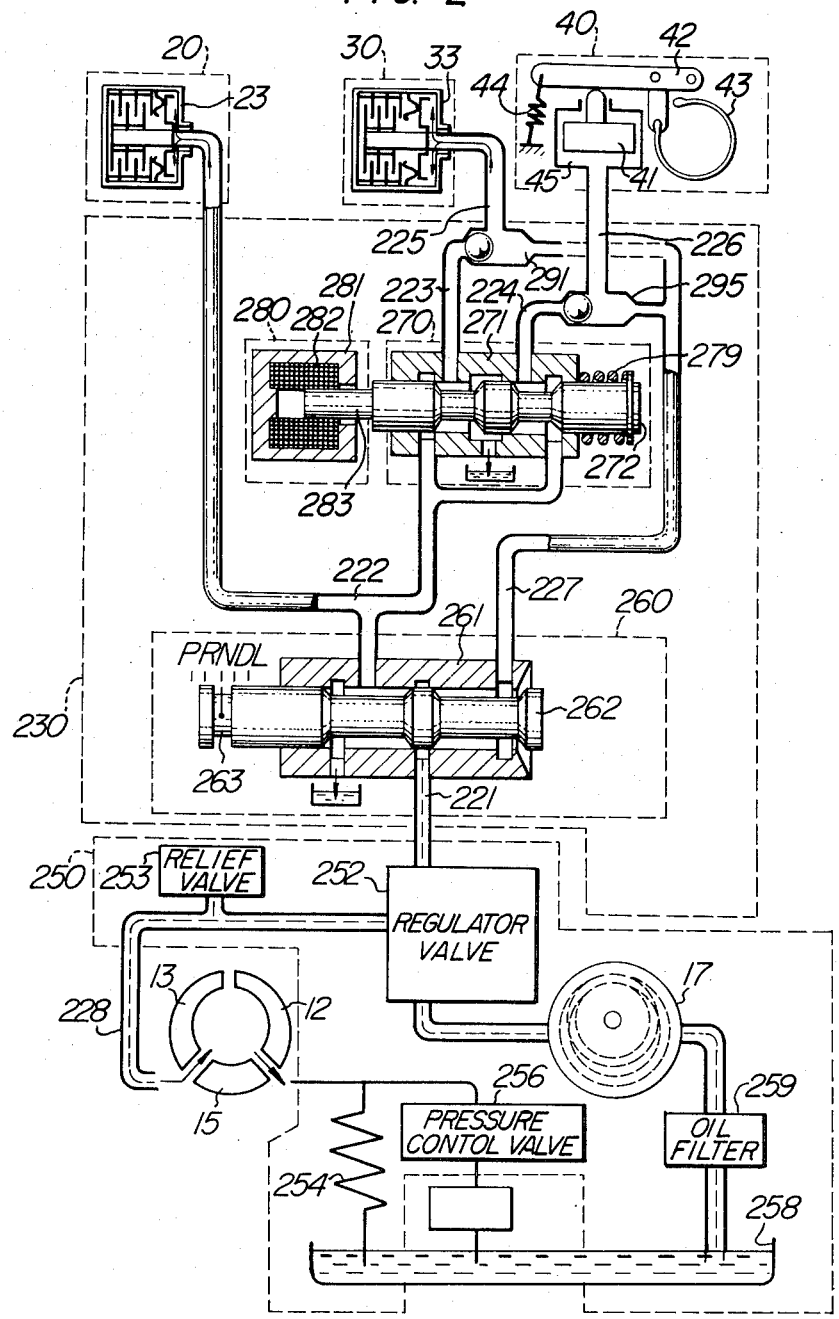
FIG. 2 is a diagram showing the construction of a hydraulic actuation circuit used when the present invention is applied to a two forward speed automatic transmission system.

The rear brake 40 comprises, as shown in FIG. 2, a brake piston 41, a brake link 42, a brake band 43, a return spring 44 and a brake cylinder 45, so that when the working oil pressure is applied to the brake cylinder, the brake band 43 is applied to tighten so as to hold a carrier 58 of the gear train 50 against rotation with respect to a housing 18.

These clutches and brakes are of the same types as well known in the art. The gear train 50 comprises, for example, a primary sun gear 51, a secondary sun gear 57, a third sun gear 55, a primary planetary gear 52, a secondary planetary gear 54, an output shaft 56 and a carrier 58. The gear train 50 consists of a planetary bevel-gear system wherein the primary sun gear 51 and the secondary sun gear 57 mesh with the primary planetary gear 52 in opposed relation and the secondary planetary gear 54 is integrally formed with the primary planetary gear 52 so that it is adapted to mesh with the third sun gear 55. In this planetary bevel-gear system, the gears are engaged and disengagement for different gear changing operations in the manner which will be explained hereunder. In high gear, as will be seen from the figure, with both the front clutch 20 and the rear clutch 30 engaged, the primary sun gear 51 and the secondary sun gear 57 rotate at the same speed and the carrier 58 is off, so that the output shaft turns at the same rotational speed as the two sun gears and thus the rotation is transmitted at a 1 : 1 ratio. In low gear, as the front clutch 20 is engaged and the rear brake is applied, the input power is applied to the primary sun gear 51, the carrier 58 is held stationary and the secondary sun gear 57 is released, so that the output shaft rotates at $1/K$ times the speed of the input shaft, where $K$ is the gear ratio. In reverse gear, the rear clutch 30 and the rear brake 40 are both applied so that the input power is applied to the secondary sun gear 57, the primary sun gear 51 rotates freely and the rear brake 40 holds the carrier against rotation. The output shaft 56 then rotates in the reverse direction at $1/K$ times the input speed.

Next, the revolution detecting means will be explained hereunder. A torque converter pump shaft revolution detecting means 70 comprises a revolution detector 71 (which will be discussed later in detail) mounted on the housing 18 and a toothed disk 72 mounted on the torque converter pump 72, so that if the toothed disk 72 has $n_1$ teeth, the detector 71 produces electrical signals $S_1$ which are $n_1$ times as many as the number of revolutions $N_1$ of the torque converter pump 12. Since the output shaft of the internal combustion engine is integrally connected to the shaft 11, the detected signals represent in fact the detection of the number of revolutions of the internal combustion engine ($S_1 = n_1 N_1$). A torque converter turbine shaft revolution detecting means 80 comprises a revolution detector 81 (which may be of the same construction as 71) mounted on the housing 18 and a toothed disk 82 (which may be of the same construction as 72). The toothed disk 82 is mounted on the front clutch drum 21 which is integral with the torque converter turbine shaft 14. Thus, assuming that the disk 82 has $n_2$ teeth (for example, $n_2 = 17$), the revolution detector 81 produces electrical signals $S_2$ which are $n_2$ times the number of revolutions $N_2$ of the shaft 14 ($S_2 = n_2 N_2$). This detection of the revolution of the torque converter turbine shaft 14 may be replaced, instead of detecting it by the detector 80, by the calculation of a value detected at a different place such as the one which is designated for an output shaft revolution detecting means 90 (this will be discussed later), and moreover, the intended object of the present invention may be achieved as a matter of fact by detecting the revolutions at any place to which the revolutions of the torque converter turbine shaft 14 are imparted in direct drive.

The output shaft revolution detecting means 90 comprises a revolution detector 91 (which may be of the same construction as 71 and 81) mounted on the housing 18 and a toothed disk 92 which is integrally coupled to the output shaft 56, so that if the number of teeth in the disk 92 is $n_3$ (for example, $n_3 = 17$), the detector 91 generates electrical signals $S_3$ which are $n_3$ times as many as the number of revolutions $N_3$ of the output shaft 56 ($S_3 = n_3 N_3$). Assuming now that K represents the gear ratio, the relationship as expressed by the following relation holds between the signals $S_2$ and $S_3$:

$$S_2 = K(n_2)/(n_3)S_3 \text{ or}$$

$$S_3 = (n_3)/n_2 K)S_2$$

where $K = N_2/N_3$ (gear ratio). In other words, it is to be understood that the revolutions $N_2$ of the torque converter turbine shaft can also be derived from the output shaft revolutions $N_3$ according to these formulas.

The detection of the output shaft revolutions $N_3$ means the detection of the driving conditions of a vehicle, hence the vehicle speed, while on the other hand the detection of the torque converter pump shaft revolutions $N_1$ corresponds to the detection of the number of revolutions of the internal combustion engine. Likewise, the detection of the revolutions of the torque converter turbine shaft is equivalent to the detection of the speed ratio between the torque converter pump shaft 11 and the torque converter turbine shaft 14, and this in turn means the detection of the slip ratio in the torque converter which gives an indication of the torque being transmitted by the torque converter at that instant.

Figure 5:
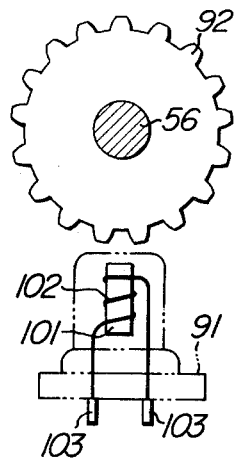
FIG. 5 is a schematic diagram showing the construction of a revolution detecting means used with the electronic operating circuit.

The construction of the detecting means will now be explained referring by way of example to the output shaft revolution detecting means 90 shown in FIG. 5. The toothed disk 92 concentrically mounted on the output shaft 56 is composed of a disk-shaped magnetic material having formed on the periphery thereof 32 teeth spaced apart at equal intervals, and the revolution detector 91 is mounted on the housing 18 adjacent to the diametrical outer periphery of the disk 92. The revolution detector 91 is composed of a permanent magnet 101 and a coil 102 wound on the magnet 101, which are housed within a suitable casing of non-magnetic material, and the detector 91 is mounted on the transmission housing by means of this casing so that the end of the permanent magnet 101 is located close to the outer periphery of the toothed disk 92. As the toothed disk 92 rotates so that the teeth on the toothed disk pass through the magnetic field produced by the permanent magnet 101, the leakage flux in the permanent magnet 101 changes thereby causing an electromotive force in the coil 102. In the case of the illustrated embodiment, 17 voltage signals will be generated for a rotation of the toothed disk 92. Generally, as previously explained, where $N_3$ represents the number of revolutions made by the toothed disk within a given time, the voltage signal will be provided in the form of an AC voltage having a frequency of $n_3 \times N_3$. In the figure, numeral 103 designates the output terminals of the detector 91.

The toothed disks 72 and 82 in the torque converter pump shaft revolution detecting means 70 and the torque converter turbine shaft revolution detecting means 80, respectively, have the same external shape as the aforesaid toothed disk 91 and they differ from the latter only with respect to the manner in which they are fixed to the torque converter turbine and the clutch drum, respectively. The output signal voltages $S_1$, $S_2$ and $S_3$ from the three revolution detecting means 70, 80 and 90 are delivered on connecting lines 311, 321 and 331, respectively.

According to the present invention, the above-mentioned various revolutions or speeds are detected in the form of the corresponding electrical signals, so that these revolutions and the speed ratios are electronically computed from the detected electrical signals to thereby issue shift commands to the hydraulic actuation circuit in accordance with the predetermined shift patterns, whereupon the hydraulic actuation circuit is brought into action to provide the required gear changes in the gear train 50.

In the discussion to follow, the hydraulic actuation circuit will be explained. In FIG. 2, there is shown the construction of the hydraulic actuation circuit which is broadly divided into an oil pressure source 250 and a hydraulic circuit 230. The hydraulic circuit 230 comprises a shift region setting valve 260, a distributor valve 270, a solenoid 280, check valves 291 and 295 and the associated oil passages. The oil pressure source 250 comprises an oil pump 17, an oil filter 259, an oil pan 258, a pressure control valve 256, a regulator valve 252, a relief valve 253, an oil cooler 254, etc. The oil pressure source 250 functions to supply working oil for the torque converter, lubricating oil for the transmission gears and oil under pressure for the hydraulic actuation circuit (these functions are well known in the art and therefore will not be explained here). The shift region setting valve 260 comprises a valve spool 262 and a valve casing 261, and the valve spool 262 is linked to a control lever (not shown) installed in the driver's compartment, such that this valve is actuated in associated relation as the control lever is moved into its positions P, R, N, D and L (which are the conventionally used gear selecting positions and the corresponding letters, namely, P designating, parking; R, reverse; N, neutral; D, drive; and L, low gear). Those positions P, R, N, D and L shown in FIG. 2 designate the corresponding positions into which the valve spool 262 is moved upon the movement of the control lever. To be more specific, a slot 263 provided at the left end of the valve spool 262 receives the connecting link from the control lever.

With the shift region setting valve 260 being placed in its N position, as shown in FIG. 2, an oil passage 221 is closed and oil passages 222 and 227 are opened. In the L position, the oil passages 221 and 222 communicate and the oil passage 227 is opened. However, the solenoid 280 is so designed that in this L position it will never be energized. In the D position, the oil passages 221 and 222 communicate and the oil passage 227 is opened. In the R position, the oil passages 221 and 227 communicate and the oil passage 222 is opened. In the P position, the oil passage 221 and 227 is closed and the oil passages 222 are opened. The distributor valve 270 comprises a valve casing 271 and a valve spool 272, and one end of the valve spool 272 (the left end in the illustration) is connected to a moving core 283 of the solenoid 280. When the solenoid 280 is not energized, the valve spool 272 is placed in its rightward position by means of a spring 279 engaging the other end (the right end in the illustration) of the valve spool 272, so that the oil passages 222 and 224 communicate and the oil passage 223 is opened. When the solenoid 280 is energized, the valve spool 272 is moved to the left so that the oil passages 222 and 223 now communicate and the oil passage 224 is opened. The check valve 291 connects the oil passage 223 with the oil passage 225 and closes the oil passage 227 when the working oil pressure is applied to the oil passage 223, while it causes the oil passage 227 to communicate with the oil passage 225 and cuts off the oil passage 223 when the working oil pressure is applied to the oil passage 227. The check valve 295 functions such that when the working oil pressure is directed to the oil passage 224, it causes the oil passage 224 to communicate with the oil passage 226 and closes the oil passage 227, whereas when the working oil pressure is admitted to the oil passage 227, it connects this oil passage 227 with the oil passage 226 and cuts off the oil passage 224. When the coil 282 of the solenoid 280 is energized, its moving core 283 (together with the valve spool 272 of the distributor valve 270) is attracted to move to the left, while it is returned to the right by the action of the spring 279 when there is no current flowing in the solenoid coil 282. Though the solenoid 280 is used in this embodiment, any other electrical actuator capable of converting electrical signals into mechanical displacements may be considered to come within the scope of the present invention.

By means of the aforesaid hydraulic elements, the gear train 50 provides the required gear ratios for the various operating conditions as N, D, L, R and P.

These gear changing operations will be explained in detail hereunder.

Neutral:

In this position, as shown in FIG. 2, the working oil pressure is cut off by the shift region setting valve 260 and all the actuators (i.e., the front clutch, rear clutch and rear brake) are disengaged and put out of action. Thus, the torque converter turbine shaft 14 is permitted to rotate freely. That is, the vehicle is at a standstill. In the figure, those portions of the oil passages which are supplied with the working oil pressure are denoted by the broken lines in the oil passages.

Driving range:

The D position has two alternative positions, that is, the DL and DH positions. In other words, DL position indicates the low gear in the drive range, while the DH position indicates the high gear at the drive range.

DL position:

In FIG. 2, the valve spool 272 of the distributor valve 270 is moved to the right and the valve spool 262 of the shift region setting valve 260 is placed in the D position, so that the working oil pressure is supplied to the oil passages 221, 222, 224 and 226 to apply the pressure to the front clutch 20 and the rear brake 40 and release the rear clutch 30 thereby engaging the low gear.

DH position:

In FIG. 2, the valve spool 262 of the shift region setting valve 260 is placed in the D position and the valve spool 272 of the distributor valve 270 is moved to the left (upon energization of the solenoid), so that the working oil pressure is directed to the oil passages 222, 223 and 225 to apply the pressure to the front clutch 20 and the rear clutch 30 and release the rear brake 40. Thus, the high gear is engaged.

Low gear:

In the low gear, the valve spool 262 of the shift region setting valve 260 is placed in the L position and the valve spool 272 of the distributor valve 270 is moved to the right. Then, the working oil pressure is applied to the front clutch 20 and the rear brake 40 by means of the oil passages 222 and 224 and the rear clutch 30 is released to thereby obtain the low gear.

Reverse:

In FIG. 2, the valve spool 262 of the shift region setting valve 260 is placed in the R position and the valve spool 272 of the distributor valve 270 is moved to the right. In this condition, the working oil pressure is applied to the rear clutch 30 and the rear brake 40 through the oil passages 221, 227, 225 and 226 and the front clutch 20 is released. This engages the reverse gear.

Parking:

In this position, the valve spool 262 of the shift region setting valve 260 is moved into the P position and the valve spool 272 of the distributor valve 270 is moved to the right, so that the working oil pressure is cut off by the valve spool 262 in the same manner as in the N position of FIG. 2 with all the actuators being released. It is well known in the art that, though not shown in the figure, a parking device is provided which is linked to the shift region setting valve 260 to mechanically lock the output shaft 56 in the P position. On the other hand, provision is made for an automatic shift in the drive range so as to give automatic shift between the DH and the DL positions depending on whether the solenoid 280 is energized or de-energized. Accordingly, the shift regions which causes the solenoid to be energized or de-energized at these shift points (lines) will be explained hereunder.

According to the present invention, the operating conditions of the internal combustion engine is represented by the torque converter pump shaft revolution $N_1$, the operating condition of the torque converter by the converter slip ratio and the driving conditions of the vehicle by the output shaft revolution $N_3$, the shift lines required for the vehicle are determined by the values of these factors.

Limits of internal combustion engine rpm:

Generally, the smooth rotation of an internal combustion engine can be hardly expected at speeds below a certain value and thus it is not preferable to make a shift from low to high gear at much slower engine speeds. In other words, a shift in this case must be effected at speeds higher than the minimum rpm peculiar to the internal combustion engine under consideration. In short, the shift region must be limited to speeds higher than the specified rpm. (In this case, there is a lower limit to the shift region depending on the performance of the internal combustion engine.) On the other hand, for a shift from the high to the low gear, it is preferable to keep the vehicle running in the high gear until the lowest possible speed has been reached. Thus, in this case the shift region is limited to those engine speeds which are below a relatively low rpm. (In this case, there is an upper limit to the shift region as determined by the engine performance.)

Vehicle speed limits:

In vehicles, and especially in an automobile, it is preferable not to change the gear ratio from the low to the high gear in such a manner that the vehicle starts to run in the high gear at an excessively low speed, because the acceleration and deceleration by means of the accelerator pedal cannot be achieved at the driver's will. Thus, the shift region in this case is limited to car speeds higher than a certain minimum value. (In this case, the shift region has a certain lower limit which is determined by the vehicle's performance.) On the contrary, when changing the gear ratio from high to low gear, it is preferable to retain the high gear until the lowest possible speed is reached, because shifting in the low gear position is not desirable from the aspects of noise, vibration, etc. In this case, the shift region is limited by the car speed which is not excessively high (Here, there is an upper limit to the shift region which is determined by the performance of the vehicle).

Slip ratio limits:

The torque transmission performance of the torque converter differs considerably when the slip ratio (here, the slip ratio is given $2/NN_21$) is below a value close to unity or higher than unity. In other words, the former indicates that the torque is being transmitted from the internal combustion engine to the output shaft, while the latter indicates that the torque is being transmitted from the output shaft 56 to drive the engine. These situations will be explained hereunder.

The transmission of torque from the engine to the output shaft 56 through the torque converter takes place during normal driving, hill climbing, etc. In order to make full use of the performance of the torque converter, it is preferable to shift from low to high gear in the range where the slip ratio is about unity. This range of slip ratio is somewhat between 0.5 and 1.00, and in the case of FIG. 3a the shift point is set at the slip ratio of 0.9. On the other hand, when shifting from high to low gear, it is preferable to retain the high gear until the slip ratio becomes lower than the aforesaid value in order that the performance of the torque converter is fully utilized. In this case, the shift region is limited to a slip ratio lower than a predetermined value, which is determined by the torque converter performance (In this case, the shift region has an upper limit of the slip ratio value determined by the torque converter performance and this upper limit is about 0.9. In the example shown in FIG. 3b, this value is 0.60).

The torque will be transmitted from the output shaft 56 to the engine (1) during the deceleration which is generally called the engine braking condition, and (2) when the car speed is increased as it descends a gentle slope.

Shifting from low to high gear will be required under the driving condition of (2) above, where the car speed must be increased gradually. In this case, it is preferable that the gear change occurs at the slip ratio of about unity. In other words, the shift region is limited to a suitable slip ratio within a range of the order of 1.00 as determined by the performance of the torque converter. This range of slip ratio is somewhat between 0.9 and 1.3, and in the example shown in FIG. 3a the shift line is set to the ratio of 1.05.

Shifting from the high to the low gear will be required under the above driving condition (1) when strong braking must be effected for rapid deceleration or braking must be provided on a descent, and in this case the slip ratio tends to assume a value which will be much higher than unity. Then, it will be necessary to provide engine braking by ensuring an early shift to the low gear prior to the slip ratio becoming excessively high. In other words, the shift region is limited to a slip ratio higher than a certain value which is determined by the performance of the torque converter (the shift region has an upper limit of the slip ratio value as determined by the torque converter performance and this upper limit is 1.00. In the example shown in FIG. 3b, this value is set to 1.1). As described above, the gear changing requirements for a shift from low to high gear include four kinds of speed limits, that is, the engine speed limit, the car speed limit, the limit of the slip ratio when the torque is transmitted from the engine to the output shaft 56, and the slip ratio limit when the torque is transmitted to the engine from the output shaft 56. When all these conditions exceed these limits, a shaft is effected to the higher gear. The requirements for changing the gear ratio from high to low gear also include four kinds of speed limits, that is, the engine speed limit, the car speed limit, the slip ratio limit when the torque is transmitted to the output shaft 56 from the engine, and the slip ratio limit when the torque is transmitted to the engine from the output shaft 56. In the presence of those conditions which exceed these limits, a downshift to the low gear is effected. These four kinds of gear change speed limits are independent of one another, so that the occurrence of a condition that exceeds any one of the limits results in a gear shift.

While the car speed limits have been explained hereinbefore, the car speed can be detected in terms of the revolutions $N_3$ of the output shaft 56 as previously discussed. However, since the revolutions $N_3$ can be calculated in terms of the torque converter turbine shaft revolution $N_2$ (according to the previously mentioned formulas) so that all the factors can be graphically represented on the same plane, the car speeds will be represented by the turbine shaft revolutions $N_2$ in the discussion to follow. Although the various gear change limits have been explained hereinbefore, the optimum shift lines are used for the actual gear shifts, which are determined in accordance with the engine performance, the torque converter performance and the vehicle performance at the most suitable ranges within these limits. In the case of a petrol-driven car, these shift points or lines can be given as shown in FIGS. 3a and 3b.

Figure 3A:
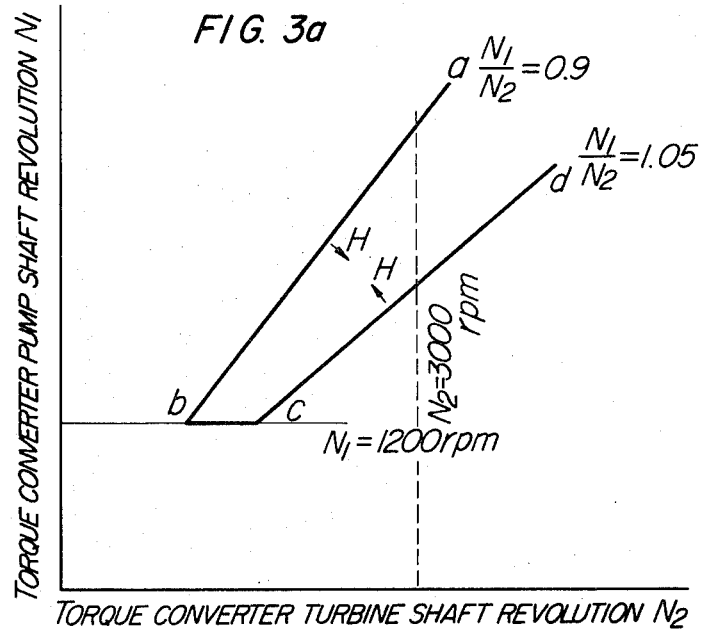
FIGS. 3a and 3b are shift diagrams showing an example of the shift regions.

Assuming that the torque converter pump shaft revolutions $N_1$ (engine speed) is 1,200 rpm (constant), the torque converter turbine shaft revolution $N_2$ (corresponding to the car speed) is not limited in any way, the slip ratio $N_2/N_1$ when the torque is transmitted from the torque converter pump shaft (engine) to the torque converter turbine shaft (output shaft 56) is 0.9, and the slip ratio $N_2/N_1$ when the torque is transmitted from the converter turbine shaft (output shaft 56) to the converter pump shaft (engine) is 1.05 (constant) for the shift lines from low to high gear, the shift region for a gear change from low to high gear is given as the area defined by the solid lines $a$, $b$, $c$, and $d$ in FIG. 3a. In other words, the abovementioned values define the shift lines for this gear change, so that the gear change takes place when the driving conditions of the car exceed these values. Thus, when the driving conditions move into the area defined by the solid lines $a$, $b$, $c$ and $d$ in FIG. 3a as shown by arrows H, the gear ratio is changed from low to high gear.

Figure 3B:
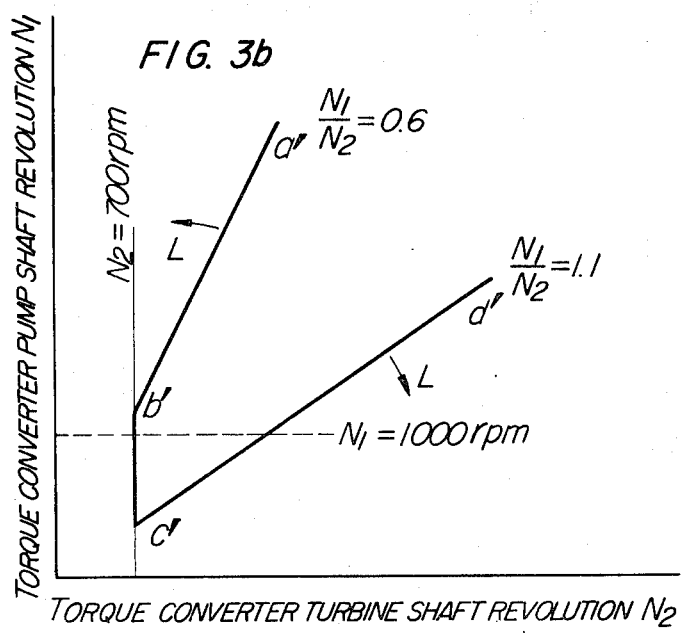

As regards the shift lines from high to low gear, assume that the torque converter pump shaft revolutions $N_1$ (engine speed) is not limited in any way, the torque converter turbine shaft revolutions $N_2$ (corresponding to the car speed) is 700 rpm, the slip ratio $N_2/N_1$ when the torque is transmitted from the converter pump shaft (engine) to the converter turbine shaft (output shaft 56) is 0.6, and the slip ratio $N_2/N_1$ when the torque is transmitted from the converter turbine shaft (output shaft 56) to the converter pump shaft (engine) is 1.1, the shift region for a gear change from the high to the low gear is given as the area defined by broken lines $a'$, $b'$, $c'$ and $d'$ in FIG. 3b. In other words, the aforementioned values define the shift lines for this gear change, so that the gear change takes place when the driving conditions of the car exceed these values. Thus, when the driving conditions move out of the area defined by the broken lines $a'$, $b'$, $c'$ and $d'$ in FIG. 3b as shown by arrows L, the gear ratio is changed from high to low gear.

While these shift regions have been explained by means of the shift diagrams wherein the ordinate represents the torque converter pump shaft revolutions $N_1$ and the abscissa represents the torque converter turbine shaft revolutions $N_2$, the shift regions may be illustrated by means of those shift diagrams in which the ordinate represents the throttle positions and the abscissa represents the car speeds (the torque converter pump shaft revolutions $N_1$ = 1200 rpm or the torque converter turbine shaft revolutions $N_2$ = 1,000 rpm is given as 10 Km/h in car speed equivalent). This also comes within the scope of the present invention.

Next, shift operating circuitry incorporating logic circuits will be explained to illustrate an example of the electrical circuitry used for controlling the distributor valve in the hydraulic actuation circuit in accordance with predetermined shift lines. It is to be noted, however, that the present invention is not limited in any way to this electrical circuitry, and any electrical circuitry adapted to control the said distributor valve by means of a relay circuit may also be utilized with the present invention.

Figure 4:
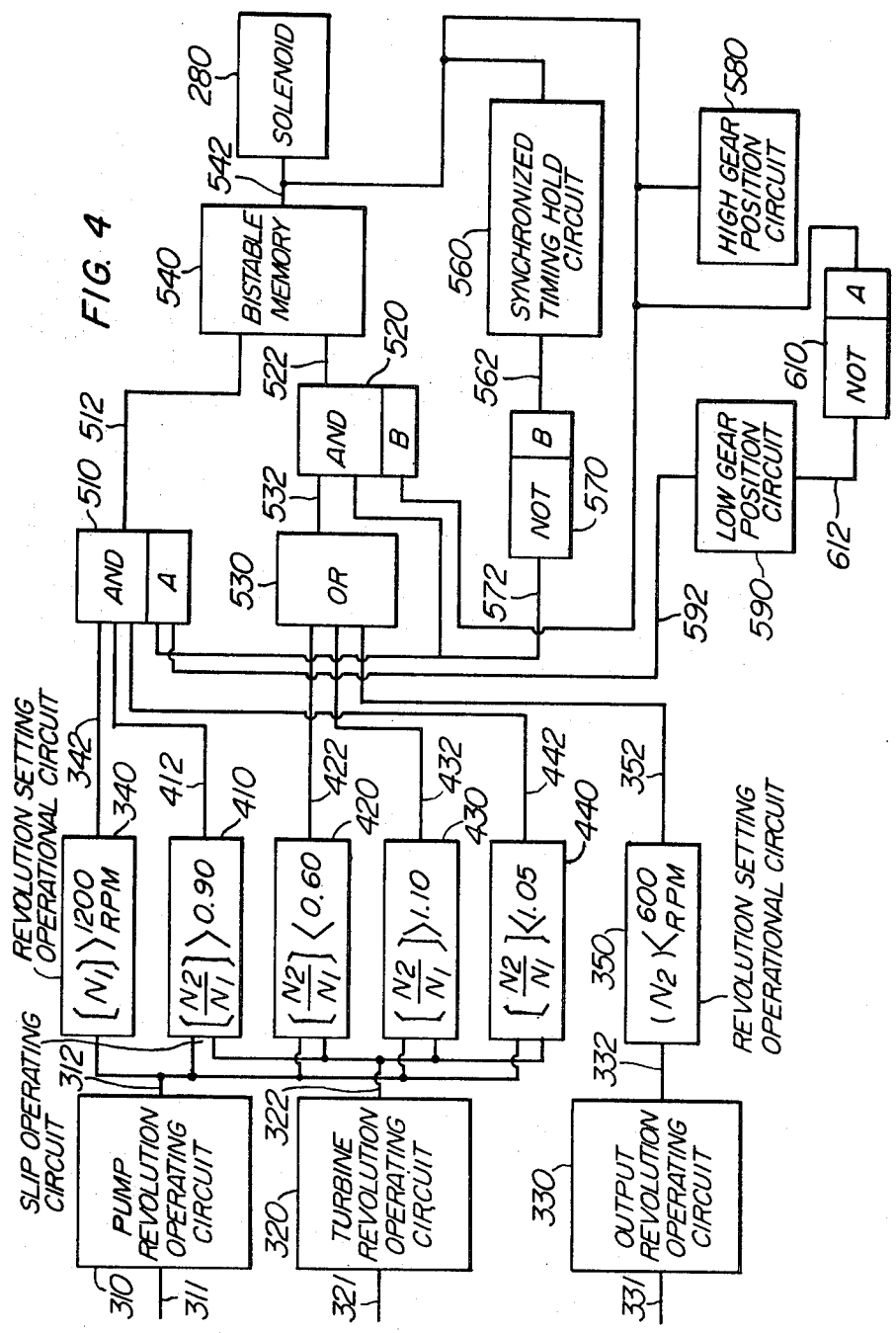
FIG. 4 is a block diagram showing an electronic operating circuit.

Shift Operating Circuit:

The shift operating circuit for determining the shift lines comprises, as shown in FIG. 4, revolution operating circuits 310, 320 and 330 for detecting the revolutions of the torque converter pump shaft, the torque converter turbine shaft and the output shaft; four slip operating circuits 410, 420, 430 and 440; two revolution setting operational circuits 340 and 350; two AND circuits 510 and 520; an OR circuit 530; a bistable memory circuit 540; a synchronized timing hold circuit 560; two NOT circuits 570 and 610; and two gear position circuits 580 and 590. (Unless otherwise specified, the term "signal" to be used hereinafter will means a positive DC voltage with the negative side grounded.)

The component elements of this circuit will now be described. As the control lever is shifted to the D position, a circuit is established between a power source and the shift operating circuit by a switch which is not shown, so that the circuit is now ready to effect operations.

Referring now to FIG. 4, the component elements will be explained individually. The input to the torque converter pump shaft revolution operating circuit 310 is the output voltage $S_1$ from the torque converter pump shaft revolution detector 70, which is applied to the former through a line 311. The output signal of the circuit 310 is an electrical signal $[N_1]$ representing the converter pump shaft revolutions and it is delivered over a line 312. Hereinafter, those electrical signals representing various speeds will be braced by the signs [ ]. The input to the torque converter turbine shaft revolution operating circuit 320 is the output voltage $S_2$ from the torque converter turbine shaft revolution detector 80 which is applied to the former via a line 321, and its output signal is an electrical signal $[N_2]$ representing the torque converter turbine shaft revolutions and is delivered over a line 322.

The input to the output shaft revolution operating circuit 330 is the output voltage $S_3$ from the output shaft revolution detector 90 and it is received via a line 331. The output from the circuit 330 is an electrical signal $[N_3]$ representing the output shaft rpm and is delivered over a line 332.

The input to the revolution $([N_1] > 1,200$ rpm$)$ setting operational circuit 340 is the $[N_1]$ which is applied thereto via the line 312 and its output signal is an electrical signal representing the $([N_1] > 1,200$ rpm$)$ which is delivered over a line 342.

Similarly, the input to the revolution $((N_2) > 600$ rpm$)$ is the $[N_3]$ which is applied thereto via the line 332 and its output is an electrical signal representing the $((N_2) < 600$ rpm) which is delivered over the line 352. Here, the $(N_2)$ represents a value calculated in terms of the torque converter turbine shaft revolutions. The inputs to the slip $([N_2/N_1] > 0.90)$ operating circuit 410 are the two signals $[N_1]$ and $[N_2]$ which are received via the lines 312 and 322. The output is a signal which represents the computation $([N_2/N_{N1}] > 0.90)$ and is delivered over a line 412. Similarly, the inputs to the slip operating circuits 420, 430 and 440 are the two signals $[N_1]$ $[N_2]$ which are received via the lines 312 and 322. The output signals are voltage signals representing the computations $([N_2/N_1] < 0.60)$, $([N_2/N_1] > 1.10)$ and $([N_2/N_1] < 1.05)$, respectively, and are delivered over lines 422, 432 and 442.

The inputs to the AND circuit 510A are the output signals from the revolution $([N_1] > 1,200$ rpm) setting operational circuit 340, the slip $([N_2/N_1] > 0.90)$ operating circuit 410 and the slip $([N_2/N_1] < 1.05)$ operating circuit 440 as well as the signals from the low gear position circuit 590 and the NOT circuit 570. The output signal is a voltage signal representing the result of the logical operation and is delivered over a line 512.

The inputs to the OR circuit 530 are the signal voltages applied via the lines 422, 432 and 442 and the output signal is delivered on a line 532.

The inputs to the bistable memory circuit 540 are the voltage signals applied thereto through the lines 512 and 522 and the output signal is delivered over a line 542.

The inputs to the synchronized timing hold circuit 560 is the signal voltage applied through a line 542 and its output signal is delivered over a line 562. The input to the NOT circuit 610 is the signal applied thereto through the line 542 and its output signal is delivered through a line 612. The input to the NOT circuit 570 is the signal applied thereto via the line 562 and its output signal is delivered via a line 572. The input signal to the high gear position circuit 580 is the signal voltage received via the line 542. The input signal to the low gear position circuit 590 is applied thereto via the line 612 and its output signal is delivered through a line 592.

The line 542 is connected to the solenoid 280, so that the output voltage from the bistable memory circuit 540 is coupled to the solenoid 280 through the line 542.

Figure 6:
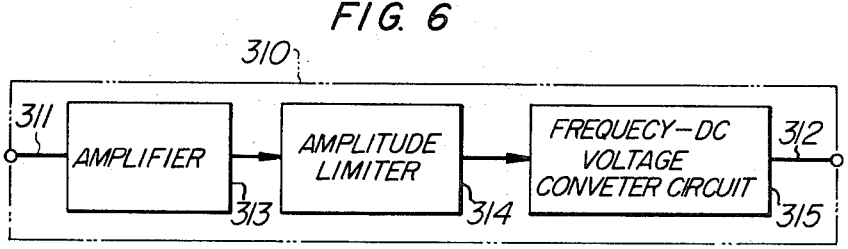
FIG. 6 is a block diagram of a revolution operating circuit in the electronic operating circuit.

The construction of the individual circuits in the shift operating circuit will now be explained. The torque converter pump shaft revolution operating circuit 310, the torque converter turbine shaft revolution operating circuit 320 and the output shaft revolution operating circuit 330 are operational circuits which receive the aforesaid signal $S_1$, $S_2$ and $S_3$ to compute the rotational speeds, and these circuits are of the same construction. The construction of these revolution operating circuits will be discussed referring by way of example to FIG. 6 illustrating the torque converter pump shaft revolution operating circuit 310. In this circuit, the input signal $S_1$ is applied via the line 311, is amplified in amplitude in an amplifier circuit 313, is applied to an amplitude limiter circuit 314 where the signal is limited in amplitude to a predetermined level, and then this AC voltage is converted to a DC voltage in a frequency-DC voltage converter circuit 315 (which is composed of a frequency detection and rectification circuit) to deliver the DC voltage through the line 312. In other words, the operation of $N_1 = 180 S_1/n_1$ has been performed.

By changing the constant of a time constant circuit comprising a resistor and a capacitor and incorporated in the frequency detection circuit of the frequency-DC voltage converter circuit 315, the operations of the torque converter turbine shaft revolution operating circuit 320 and the output shaft revolution operating circuit 330, that is, $N_2 = S_2/n_2$ and $N_3 = S_3/n_3$, respectively, can be performed.

Figure 7:
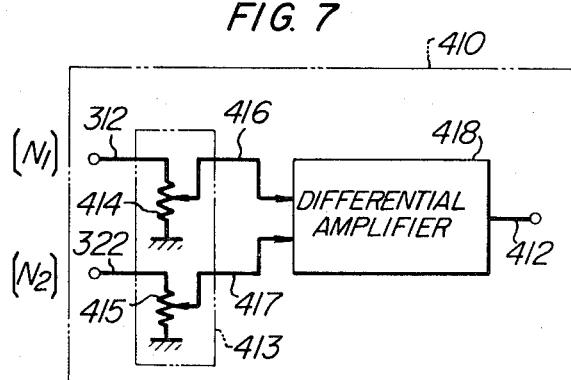
FIG. 7 is a block diagram of a slip operating circuit in the electronic operating circuit.

The output signal voltages $[N_1]$ and $[N_2]$ from the revolution operating circuits 310 and 320 are applied through the lines 312 and 322 to the four slip operating circuits 410, 420, 430 and 440. The four operating circuits are of the same construction. Thus, the construction of the slip $([N_2/N_1] > 0.90)$ operating circuit 410 is shown in FIG. 7 so as to illustrate the construction of the slip operating circuits. The lines 312 and 322 are connected to one ends of the potentiometers 414 and 415, respectively. The other ends of the potentiometers 414 and 415 are grounded, while their respective slider arms 416 and 417 are connected to a differential amplifier 418 whose output signal is developed on the line 412.

In this case, the operation of the slip ratio is the computation of $([N_2/N_1] > 0.9)$, and this is equivalent to the computation of $[N_2] > 0.90[N_1]$ or $[N_2] - 0.90[N\pi > 0$. The slider terminal 416 is positioned such that when the signal $[N_1]$ is applied to the potentiometer 414 (via the line 312), it has an output voltage of $0.90[N_{1b}]$ the slider terminal 416. On the other hand, the slider terminal 417 is placed in position where it is directly coupled to the line 322 such that the application of the signal $[N_2]$ to the potentiometer 415 (via the line 322) causes it to develop at the slider terminal 417 a voltage corresponding to the $[N_2]$. These two voltages are applied to the differential amplifier 418, so that the difference between the two voltages, that is, the computation of $[N_2] - 0.85[N_1]$ is performed; whereupon, if the result is positive, it is amplified to provide a predetermined voltage on the line 412. If the result is negative, no voltage appears at the output in spite of the amplification. In other words, the generation of the voltage indicates that $[N_2] - 0.90[N_1] > 0$. This means the computation of $[N_2/N_1] > 0.90$. On the other hand, no voltage appears at the output when $[N_2/N_1] < 0.90$. Thus, for example, if it is desired to obtain $[N_2/N_1] < 0.90$, this may be achieved in an alternative manner in which the signal $[N_2]$ is conversely applied to the line 312 which, in this case, is directly coupled to the slider terminal 416, and at the same time the signal $[N_1]$ is applied to the line 322 and the slider terminal 417 is placed in position such that a signal voltage corresponding to $0.90[N_1]$ is taken at the slider terminal 417.

Thus, by suitably adjusting the settings of the potentiometers and suitably selecting the input terminals in the manner described above, the computations of $[N_2/N_1] > 1.10$, $[N_2/N_1] < 0.60$ and $[N_2/N_1] < 1.05$ can also be performed. The output signals from the slip operating circuits appear as a voltage on each of the lines 412, 422, 432 and 442.

There are two revolution setting operational circuits 340 and 350. These circuits are operational circuits which determine whether an output signal should be produced depending on whether the input voltages $[N_1]$ and $[N_3]$ are higher or lower than the predetermined values. The circuit constructions are the same as each other.

Figure 8:
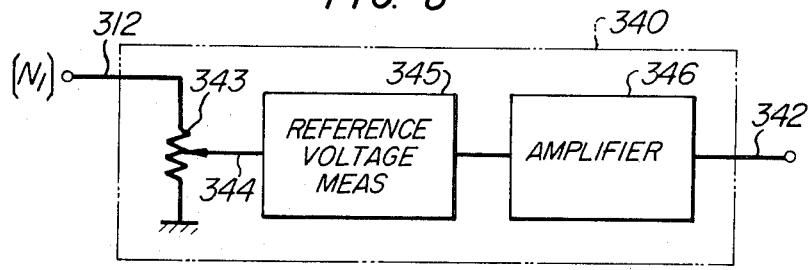
FIG. 8 is a block diagram of a revolution setting operating circuit in the electronic operating circuit.

In FIG. 8, there is shown the construction of the revolution setting operational circuit 340 for the $[N_1] > 1,200$ rpm so as to illustrate the construction of the revolution setting operational circuits.

The input to this circuit is a voltage representing the revolutions $[N_1]$ which is applied to a potentiometer 343 through the line 312, and a slider terminal 344 of this potentiometer is connected to a reference voltage means 345 (for example, a reference diode which conducts at a voltage level higher than the reference voltage). Its output is connected to an amplifier circuit 346 whose output is delivered on the line 342. The slider terminal 344 is placed in position such that the voltage $[N_1]$ applied to the potentiometer 343 is divided to a suitable voltage by the slider terminal 344. As the voltage across the reference voltage means 345 is exceeded by the voltage at the slider terminal 344, the reference voltage means 345 provides a signal to the amplifier circuit 346 which in turn provides the amplified voltage. On the other hand, if the voltage across the reference voltage means 345 becomes higher than the voltage at the slider terminal 344, no voltage appears at the output. For example, in the case of a circuit construction wherein an output signal (voltage) appears on the line 342 at 200 rpm when the slider terminal 344 of the potentiometer 343 is placed in position so that it is directly coupled to the line 312, the setting of $[N_1] > 1,200$ rpm can be achieved by placing the slider terminal 344 at a position apart from the grounded end by 200/1200 so that the output signal voltage is delivered over the line 342 only when the $[N_1]$ is larger than 1,200 rpm. For the setting of $[N_1] > 600$, the slider terminal 344 is placed at a position apart by 200/600 so that an output voltage corresponding to the $[N_1] > 600$ rpm is delivered on the line 342. Furthermore, the amplifier circuit 346 may include as a part thereof a phase inverter circuit so that an output signal (voltage) is derived only when $[N_1] < 1,200$ rpm.

In this manner, the computations of $[N_1] > 1,200$ rpm and $[N_2] < 600$ rpm can be performed.

For gear changing purposes, it is essential to know whether the transmission is in the low gear or the high gear position. For this purpose, a signal representative of the energization of the solenoid 280, that is, the voltage applied to the solenoid 280, is taken as the signal of the high gear position circuit. Furthermore, when the voltage is applied to the solenoid 280, the voltage is eliminated by the NOT circuit 610 (a phase inverter circuit which has no voltage at the output when a voltage is applied to the input), while it generates an output signal voltage when no voltage is applied to the solenoid 280. This output signal voltage is taken as the signal from the low gear position circuit 590. In addition to these signals, the gear position signals may include any signals provided that they properly indicate the selected gear positions. Thus, other forms of arrangement for deriving electrical signals for this purpose from the hydraulic actuation circuit or a part of the gear train may come within the scope of the present invention.

The hydraulic actuation circuit and the transmission will be engaging in a gear changing operation during a little while just following the moment at which the solenoid 280 is energized or de-energized. Thus, should the application of another different shift signal take place, it prevents the current gear changing operation from being carried out to the full extent. Therefore, provision must be made to ensure the maintenance of the existing situation, such that the application of another shift signal cannot initate another gear changing operation until the current one has been completely carried out.

Figure 9:
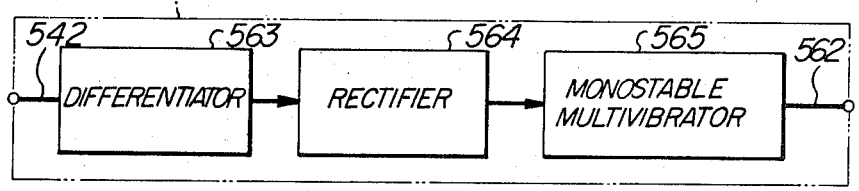
FIG. 9 is a block diagram of a synchronized timing hold circuit in the electronic operating circuit.

In order to provide a signal for this purpose, as shown in FIG. 9 by way of example, the synchronized timing hold circuit 560 (also described in Shirai et al. U.S. Pat. No. 3,572,168) is incorporated comprising a differentiator circuit 563, a rectifier circuit 564 and a monostable multivibrator 565. In operation, when a step-like voltage applied to the solenoid 280 is coupled to the circuit through the line 542, the voltage is differentiated by the differentiator circuit 563 so that a signal is produced each time the solenoid is energized or de-energized. The signal is then rectified in the rectifier circuit 564. This signal is used to trigger the monostable multivibrator 565 to provide on the line 562 an output signal which remains on for a time t. This signal of the time duration t is reversed in the NOT circuit 570 (which is composed of a phase inverter circuit) so that the signal vanishes for t seconds. The reversed signal is then delivered via the line 572.

In order to maintain the synchronized timing, an alternative is also possible wherein the completion of a gear change in the transmission following the energization or de-energization of the solenoid is detected at any suitable portion of the hydraulic actuation circuit or the transmission in the form of an electrical signal. It is to be understood that this alternative comes within the scope of the present invention.

The AND circuit 510 is the one which is generally known as an AND gate or coincidence gate (see the like numbered circuit in the Shirai et al. U.S. Pat. No. 3,572,168), and it provides an output signal voltage on the line 512 when it simultaneously receives all of the $[N_1] > 1200$ rpm signal from the revolution setting operational circuit 340, the $[N_2/N_1] > 0.90$ signal from the slip operating circuit 410, the $[N_2/N_1] < 1.05$ signal from the slip operating circuit 440, and the respective signals from the low gear position circuit 590 and the NOT circuit 570.

The AND circuit 520 is also the one which is generally known as an AND gate or a coincidence gate, and it provides an output signal on the line 522 when it receives simultaneously all of the output signal from the OR circuit 530 and the respective signals from the high gear position circuit 580 and the NOT circuit 570.

The OR circuit 530 provides an output signal (voltage) on the line 532 when it receives any one of the output signals from the revolution setting operational circuit 350, the slip operating circuit 420 and the slip operating circuit 430.

Figure 10:
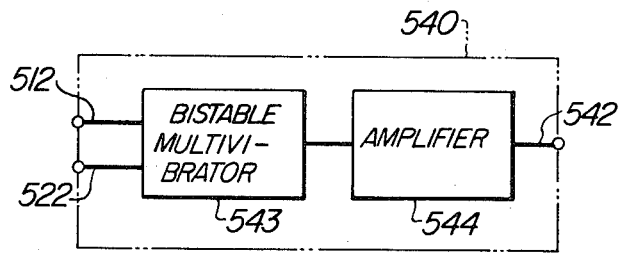
FIG. 10 is a block diagram of a bistable memory circuit in the electronic operating circuit.
Figure 11:
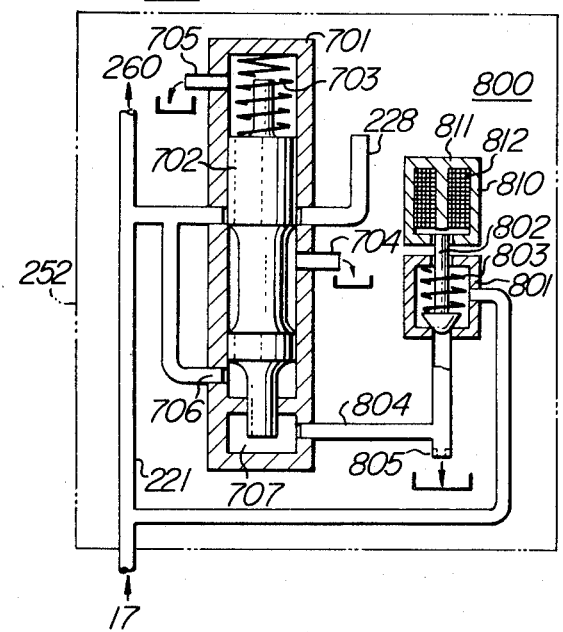
FIG. 11 is a schematic diagram showing the construction of a regulator valve.

In FIG. 10, there is shown the construction of the bistable memory circuit. The lines 512 and 522 are connected to the input terminals of a bistable multivibrator 543 so that if, for example, a step-like signal is applied to the line 512, the bistable multivibrator 543 immediately passes into one of the stable states and its output is amplified in an amplifier circuit 544 whose output voltage is in turn provided on the line 542 to energize the solenoid 280. On the other hand, if, for example, a step-like input signal is coupled to the line 522, the bistable multivibrator 543 is switched into the other stable state so that, though its output is amplified in the amplifier circuit 544, the output voltage of the amplifier circuit 544 now extinguishes. Thus, for example, if an input voltage is applied to the line 512 and then this input signal extinguishes, the state caused by the input signal will be retained to thereby maintain the continued energization of the solenoid 280. The application of another signal to the line 512 does not change the continued energization of the solenoid 280.

Shifting from low to high gear is accomplished in the following manner. When the driving conditions of a vehicle travelling in the low gear position moves into the shift region shown in FIG. 3a, all the input signals are applied to the AND circuit 510 through the lines 342, 412, 442, 572 and 592 and the signal from this AND circuit causes the bistable memory circuit 540 to provide an output signal to energize the solenoid 280, whereupon the valve spool 272 of the distributor valve 270 shown in FIG. 2 is moved to the left and the pressure oil is applied to the front clutch 20 and the rear clutch 30 so that the gear train 50 changes the gear ratio from low to high gear.

Shifting from high to low gear takes place in the following manner. As the driving conditions of a vehicle travelling in the high gear move outside of the shift lines in FIG. 3b, the OR circuit 530 shown in FIG. 4 receives an input signal from either of the lines 422, 532 or 352 so that the AND circuit 520 now receiving all the input signals with the introduction of the signal from the OR circuit 530 generates a signal and this signal switches the bistable memory circuit 540 to the other of its stable states to thereby de-energize the solenoid 280. The valve spool 272 of the distributor valve 270 in FIG. 2 is moved to the right and the pressure oil is applied to the front clutch 20 and the rear brake 40, whereby the gear train 50 changes from the high to the low gear.

While there has been described an embodiment in which the signals derived from the torque converter pump shaft revolutions $N_1$ and the torque converter turbine shaft revolutions $N_2$ are operated in the slip operating circuits, the revolution setting operational circuits, etc., and the gear changes in the transmission take place depending on the energization or de-energization of the solenoid 280, it is self-evident that, for example, the throttle opening is used in place of the torque converter shaft revolutions so that the slider of a potentiometer is linked with the throttle and the actuation of this slider produces an output voltage corresponding to the throttle opening, while the rotational speed corresponding to the car speed is detected to provide a voltage proportional to the car speed, whereby these output signals are applied to those circuits which are similar to the slip operating circuits so as to provide the required shift lines, thereby effecting gear changes which depend on the throttle openings and the car speeds.

The present invention contemplates to reduce the working oil pressure upon gear change to eliminate the occurrence of shock due to the gear changing operations in a torque converter automatic transmission system adapted to change gears according to the shift lines determined in the above described manner. The arrangement for reducing the working oil pressure in connection with gear changing operations will now be explained.

To begin with, the hydraulic circuit incorporated in this arrangement will be discussed. The regulator valve 252 shown in FIG. 2 comprises a constant pressure valve 700 and a pressure decreasing 800 as will be apparent from FIG. 11. The constant pressure valve 700 comprises a valve casing 701, a valve spool 702 and a valve spring 703, so that oil under pressure admitted into an oil passage 221 is discharged through an oil passage 704 to thereby accomplish the oil pressure regulation. In other words, the pressure oil admitted into cavity 706 urges the valve spool 702 upward to increase the quantity of pressure oil discharged, while the valve spring 703 tends to depress the valve spool 702 against the opposing upward force of the pressure oil thereby reducing the quantity of the pressure oil discharged. The increased discharge of the pressure oil reduces the oil pressure in the oil passages 221 and 228, while the decrease in the pressure oil discharged raises the oil pressure in these oil passages. Thus, the valve spool 702 is held stationary at a position which is determined by a balance between the opposing upward force of the pressure oil in the cavity 706 and the downward force of the valve spring 703, so that the pressure oil at a predetermined oil pressure is produced in the oil passage 221.

The pressure decreasing valve 800 comprises a valve casing 801, a valve stem 802, a valve spring 803 and a solenoid 810 comprising a magnetic path 811 and a solenoid coil 812. The valve stem 802 is pressed downward by the valve spring 803 and thus the pressure oil from the oil passage 221 is normally cut off. The energization of the solenoid coil 812 raises the valve stem 802, so that the pressure oil is admitted through the oil passage 221 and via an oil passage 804 into a cavity 707 of the constant pressure valve 700. While a portion of the pressure oil is discharged from the oil passage 804 via relief port 805, the diameter of the relief port 805 is made small so that a sufficiently high oil pressure can still be produced in the cavity 707. When the coil 812 is de-energized, the valve spool 802 is pressed downward by the spring 803 so that the pressure oil to the cavity 707 is cut off and the oil within the cavity 707 is exhausted through the relief port 805 reducing the oil pressure in the cavity 707 rapidly. When the oil pressure is applied to the cavity 707, the valve spool 702 is moved upward and the quantity of the pressure oil discharged through the oil passage 704 increases, so that the oil pressure in the oil passage 221 decreases. In other words, the energization of the solenoid 810 of the pressure decreasing valve 800 reduces the oil pressure (to a predetermined value where it remains constant at this value), while the de-energization of the coil returns the oil pressure to the original level.

Figure 12:
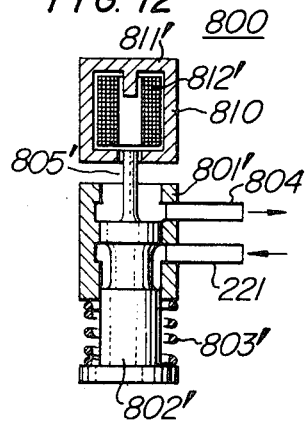
FIG. 12 is a schematic diagram showing another embodiment of the present increasing valve in the regulator valve.

FIG. 12 shows another embodiment of the pressure increasing valve 800 wherein a valve spool 802' which slides within a valve casing 801' may be employed in place of the valve stem 802 of needle valve type. Numeral 803' designates a valve spring; 810 a solenoid adapted to attract the valve spool 802' and comprising a magnetic path 811' and a solenoid coil 812'; 221 the oil passage through which the pressure oil is supplied to the pressure decreasing valve 800; 804 the oil passage for supplying the pressure oil to the constant pressure valve 700. In this arrangement, the energization of the solenoid coil 812' moves the valve spool 802' upward as it is attracted towards the magnetic path 811', so that the pressure oil in the oil passage 221 is admitted into the cavity 707 through the oil passage 804. When the solenoid coil 812' is de-energized, the valve spool 802' is pushed downward by the valve spring 803' so that no pressure oil is supplied to the oil passage 804 and the pressure oil filled in the oil passage 804 is discharged through the relief port 805'.

Figure 13:
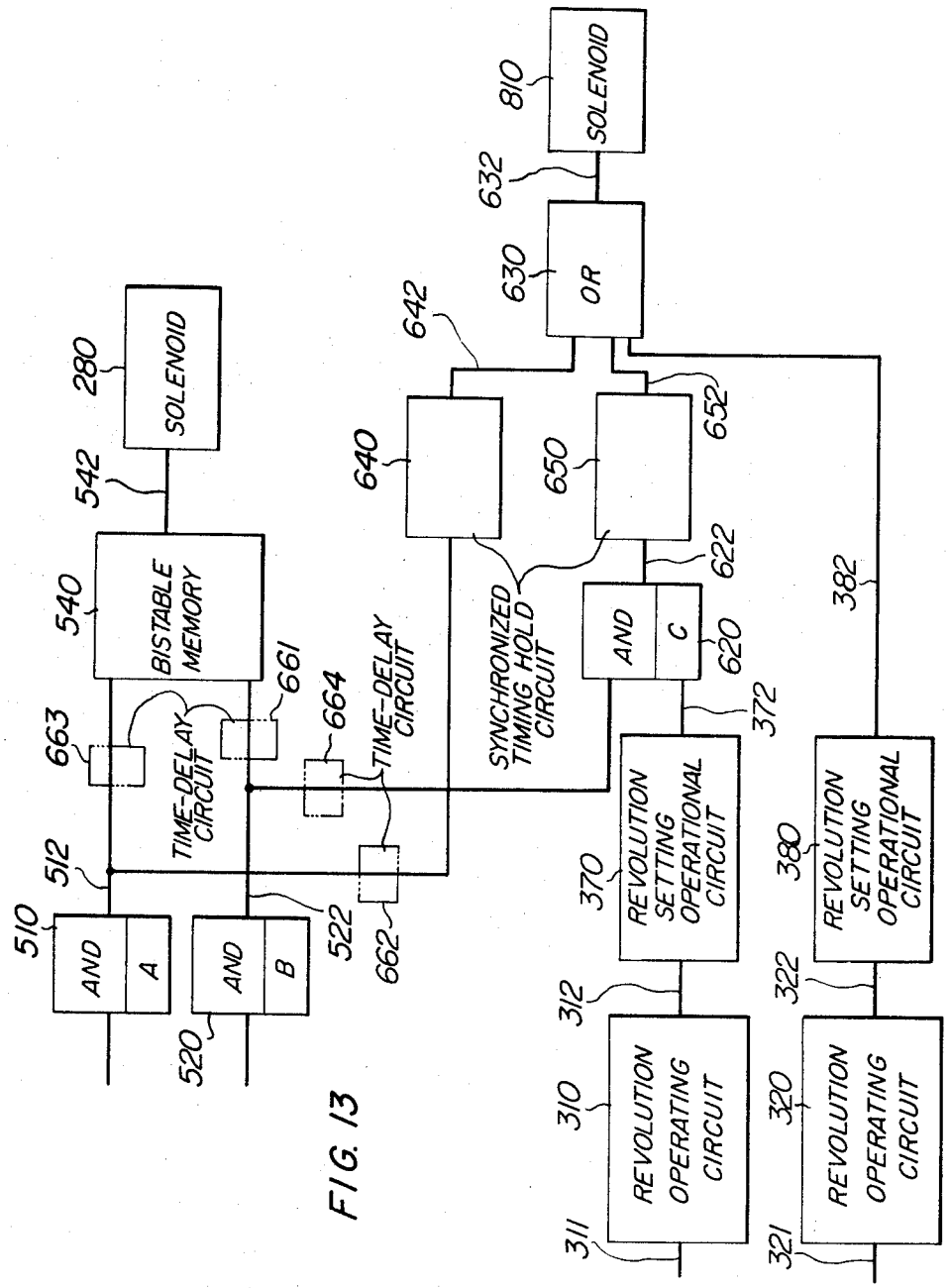
FIG. 13 is a block diagram of an operating circuit for controlling the oil pressure.

FIG. 13 is a block diagram of an oil pressure controlling operational circuit designed to reduce the working oil pressure during gear changing operations. This oil pressure controlling operational circuit controls the energization of the solenoid coil 810 to reduce the working oil pressure during gear changes in accordance with the output signals from the AND circuits 510 and 520 which are provided for normal gear changing purposes. It comprises a revolution ($[N_1] <$ 1,000rpm) setting operational circuit 370 which receives the output signal from the revolution operating circuit 310, a revolution ($[N_2] > 3,000$ rpm) setting operational circuit 380 which receives the output signal from the revolution operating circuit 320, an AND circuit 620, an OR circuit 630 and synchronized timing hold circuits 640 and 650. These circuits are of the same constructions as the previously described revolution setting operational circuits 340 and 350, AND circuits 510 and 520, OR circuit 530 and synchronized timing hold circuit 560 (see FIG. 9). In addition, time-delay circuits may be inserted, if need be, in the circuit at those positions shown by two-dot chain lines in the figure. These delay circuits each comprises an integrating circuit and an amplifier circuit, so that a definite time delay is introduced between the introduction of an input signal and the generation of an output signal.

Referring now to FIG. 4, a signal for a gear change from low to high gear is provided on the line 512 when the conditions $[N_1] > 1200$ rpm, $[N_2/N_1] > 0.90$ and $[N_2/N_1] < 1.05$ are simultaneously satisfied while the vehicle is travelling in low gear. This signal is applied to the bistable memory circuit 540 so that the solenoid 280 is energized from the output signal from this bistable memory circuit to effect a shift to the high gear. At the same time, the output signal from the AND circuit 510 is applied to the synchronized timing hold circuit 640 via the line 512 and this hold circuit produces an output signal of a predetermined time duration which is applied to the OR circuit 630 through the line 642. Immediately, the output signal from the OR circuit 630 is applied to the solenoid 810 to reduce the working oil pressure. This reduced working oil pressure returns to its original pressure level after a preset time. Thus, a shock transmitted to the vehicle upon engagement of the friction engaging means is eliminated and at the same time the working oil pressure is increased following the completion of the gear changing engagement to thereby prevent the slippage of the friction engaging means.

As the torque converter turbine shaft revolutions $N_2$ increases and eventually exceeds 3,000 rpm, the transmission is no longer required to transmit any large torque and thus the working oil pressure may be always maintained at a low value irrespective of gear changing operations. According to the present invention, in order to maintain the working oil pressure at a low value to reduce the power consumption of the gear pump, when the number of revolutions of the torque converter turbine shaft exceeds 3000 rpm, the revolution ($[N_2] > 3,000$ rpm) setting operational circuit 380 provides an output signal. This output signal is then applied to the OR circuit 630 via the line 382, so that the solenoid 810 is energized by the output signal from the OR circuit 630 to reduce the working pressure of the pressure oil delivered from the regulator valve 252.

On the other hand, when travelling in the high gear, if the slip ($[N_2/N_1] < 0.60$) operating circuit 420, the slip ($[N_2/N_1] > 1.10$) operating circuit 430 or the revolution (($N_2$) < 600 rpm) setting operational circuit 350 in FIG. 4 provide output signals, the OR circuit 530, the AND circuit 520 and the bistable memory circuit 540 are actuated to effect a shift from the high to the low gear. Then, the output signal from the AND circuit 520 is applied to the AND circuit 620 through the line 522 as shown in FIG. 13. On the other hand the output signal from the torque converter pump shaft revolution operating circuit 310 has been applied to the revolution ($[N_1] < 1000$ rpm) setting operational circuit 370, so that when the torque converter pump shaft revolutions $[N_1]$ is less than 1000 rpm, an output signal is produced on the line 372 and this signal is applied to the AND CIRCUIT 620. The AND circuit 620 produces an output signal on the line 622 only when it receives both the signals from the AND circuit 520 and the revolution setting operational circuit 370, and this output signal is changed in the synchronized timing hold circuit 650 into a signal having a predetermined time duration and it is then applied to the solenoid 810 through the OR circuit 630. Consequently, the working pressure of the oil delivered from the regulator valve 252 is reduced for the said predetermined duration.

Further, when shifting from low to high gear, if provision must be made to ensure that the required gear changing engagement occurs only after the working oil pressure has been preliminary reduced, the time-delay circuit 663 may be inserted between the AND circuit 510 and the bistable memory circuit 540. On the other hand, if it is necessary that the actual reduction of the working oil pressure takes place at a predetermined time after the generation of a shift signal, the time-delay circuit 662 may be inserted between the AND circuit 510 and the synchronized timing hold circuit 640.

Furthermore, in shifting from high to low gear, if provision must be made to ensure that the working oil pressure is reduced prior to the required gear changing engagement, the time-delay circuit 661 may be inserted between the AND circuit 520 and the bistable memory circuit 540, while on the other hand, the time-delay circuit 664 may be connected between the AND circuit 520 and the AND circuit 620, if the working oil pressure must be reduced at a predetermined time after the generation of a shift signal.

Besides, while the oil pressure controlling operational circuit of FIG. 13 has been described in conjunction with a case wherein gear changing operations are performed according to the shift lines based on the torque converter pump shaft revolutions $N_1$ and the torque converter turbine shaft revolutions $N_2$, it is also possible to effectively control the working oil pressure when the gear changing operations are performed according to those shift lines which are based on the throttle openings and the car's speed. In the latter case, the oil pressure controlling operational circuit of FIG. 13 may be rearranged such that the torque converter pump shaft revolution operating circuit 310 is replaced by an operational circuit which converts the throttle openings into a voltage form and the revolution setting operational circuit 370 is replaced by an operational circuit for setting the throttle openings, while the torque converter turbine shaft revolution operating circuit 320 is replaced by an operational circuit for converting the car speeds into voltage form and the revolution setting operational circuit 380 is replaced by an operational circuit for setting the car speeds, whereby the working oil pressure is controlled according to the throttle openings and the car speeds.

It is also self-evident that although the solenoid 810 is actuated by shift signals from the AND circuits 510 and 520 in the illustrated embodiments, the solenoid 810 may be actuated through a suitable circuitry according to the output signal from either the high gear position circuit 580 or the low gear position circuit 590 which is generated upon gear changing engagement of the gears in the transmission.

What is claimed is:

1. An automatic transmission system for use in a vehicle having an engine, said system having a shock preventing function during gear changing operations, comprising:
   a torque converter type automatic transmission including a torque converter and connected thereto a mission gear system having gears and frictional engaging means for changing gears;
   means for supplying working oil under pressure to said transmission including a hydraulic actuation circuit connected to said transmission for controlling said friction engaging means to effect gear changing operations and having a regulator valve having means for reducing the working oil pressure and connected thereto an electrically operable distributor valve for supplying pressure regulated oil to said friction engaging means;
   means for operative connection to said vehicle to develop shift up and shift down gear changing signals upon the occurrence of certain vehicle conditions;
   an electrical circuit connected between said signal developing means and said distributor valve for controlling the energization of said distributor valve in accordance with said gear changing signals to effect gear changing operations; and timing circuit means connected between said gear changing signal developing means and said regulator valve for actuating said regulator valve reducing means or a predetermined time upon receipt of one of said gear changing signals to cause the working oil pressure to be reduced for said predetermined time during the gear changing operation.

2. An automatic transmission system having a shock preventing function during gear changing operations according to claim 1, wherein said one gear changing signal is said shift up signal and there are further provided
   a revolution setting operational circuit for operative connection to said engine to generate a signal when the number of revolutions of the engine is less than a predetermined value,
   an AND circuit for producing an output signal upon concurrently receiving the signal from said revolution setting operational circuit and the shift down gear changing signal from said development means,
   second timing means connected between said AND circuit and said regulator valve for actuating said reducing means for a predetermined time after receipt of said output signal from said AND circuit to cause the working oil pressure to be reduced for a predetermined time when the number of revolutions of the engine is less than a predetermined value during the gear changing operation.

3. An automatic transmission system having a shock preventing function during gear changing operations according to claim 1, further including
   a revolution setting operational circuit for operative connection to said engine to generate a signal when the number of revolutions of the engine is larger than a predetermined value, and
   means connecting said operational circuit to said regulator valve reducing means for actuating the latter by the signal from the former to reduce the working oil pressure during the existence of the said signal generated by said revolution setting operations circuit.

4. An automatic transmission system having a shock preventing function during gear changing operations according to claim 1, further including a time-delay circuit connected between said gear changing signal developing means and said electrical circuit for delaying gear-changing operations for a time so that the working oil pressure is reduced prior to the initiation of the gear changing operation as well as during same.

5. An automatic transmission system having a shock preventing function during gear changing operations according to claim 1, further including a time-delay circuit connected between said gear changing signal developing means and said timing means for delaying said one gear changing signal for a time so that the working oil pressure is reduced at a time after the gear changing operation has been initiated as well as during same.

* * * * *